June 28, 1932.    M. ROSENBLUM    1,865,338
DIRECTION INDICATOR FOR VEHICLES
Filed Feb. 3, 1931    2 Sheets-Sheet 1
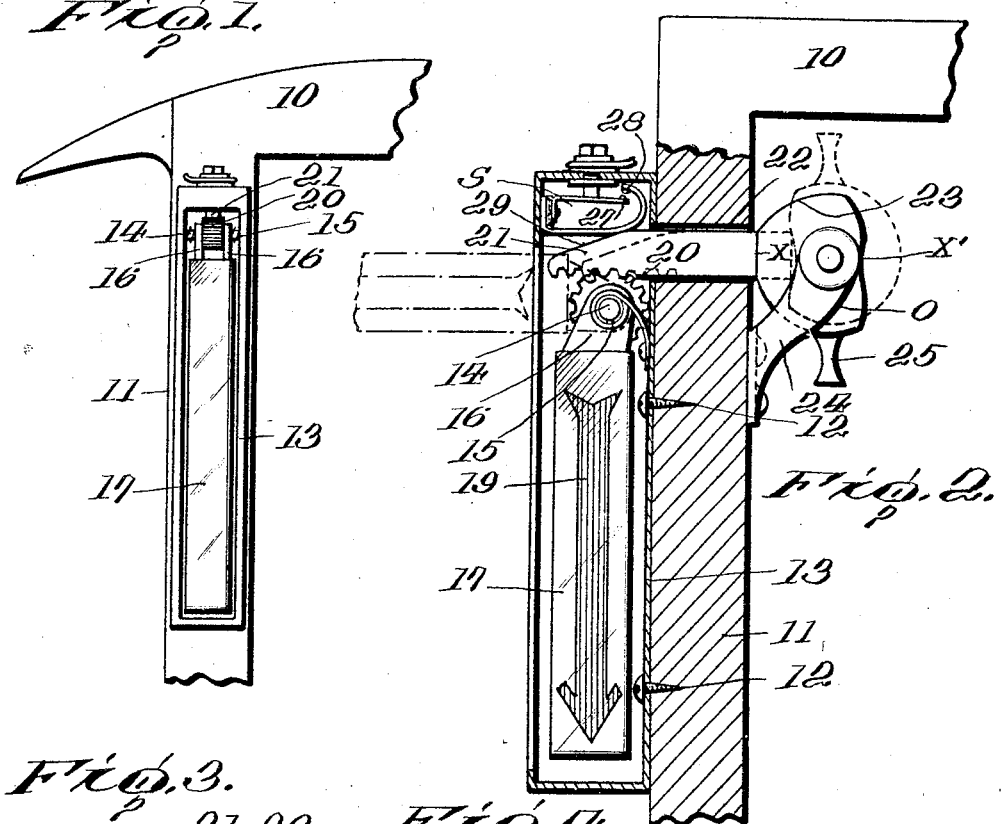
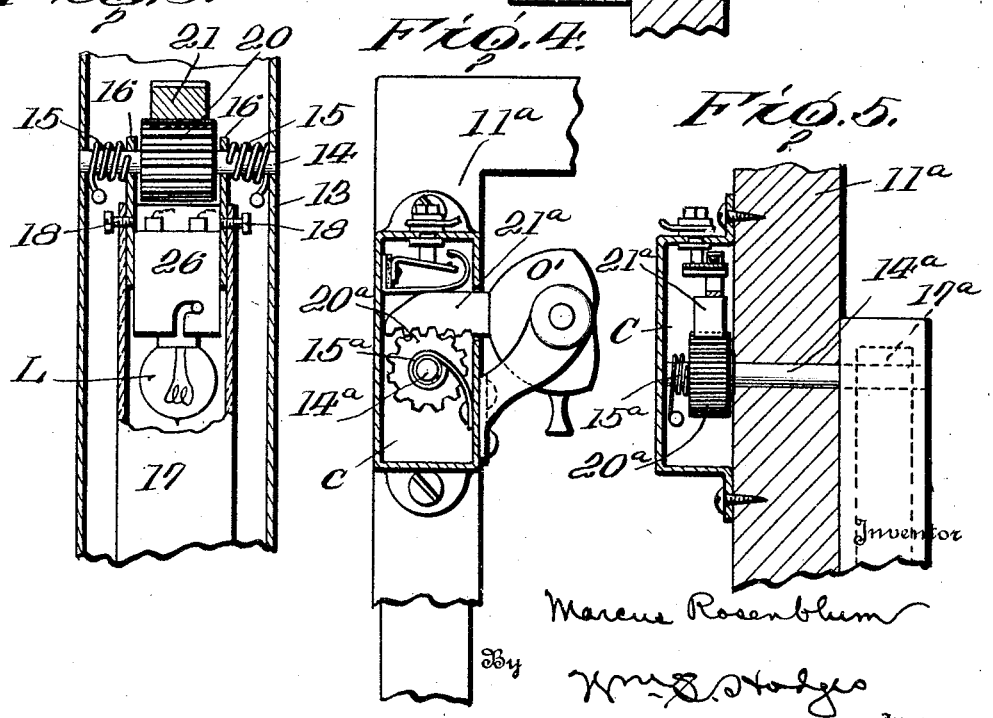

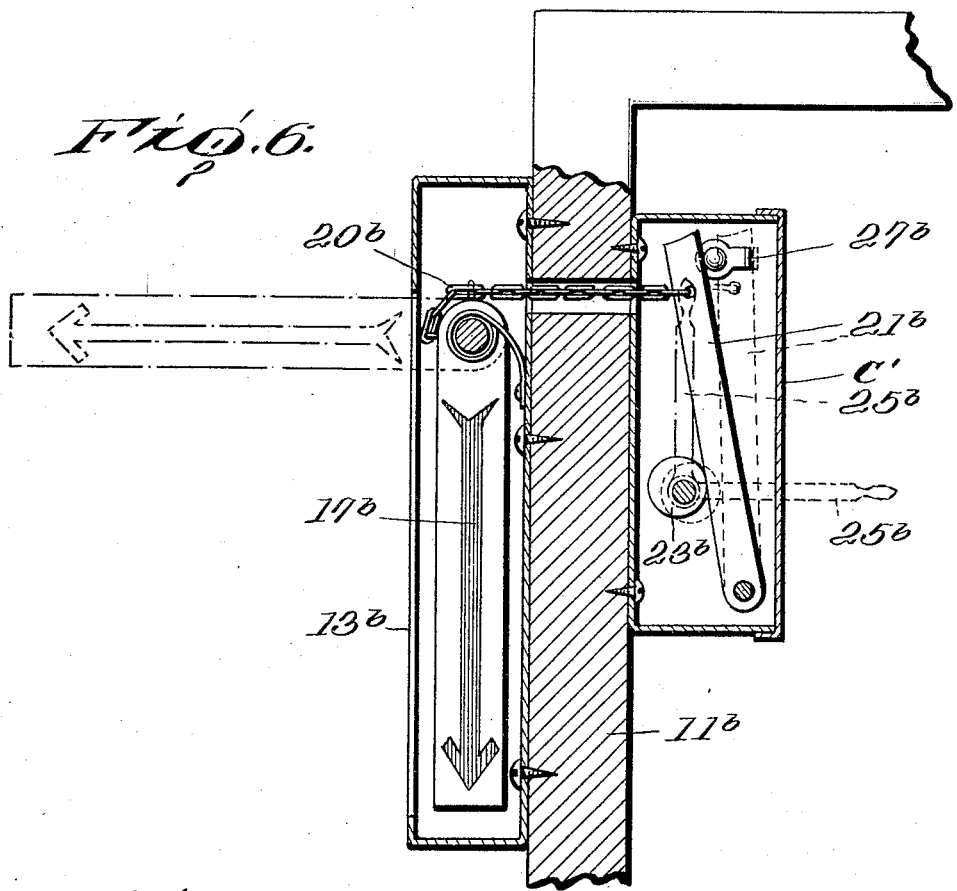
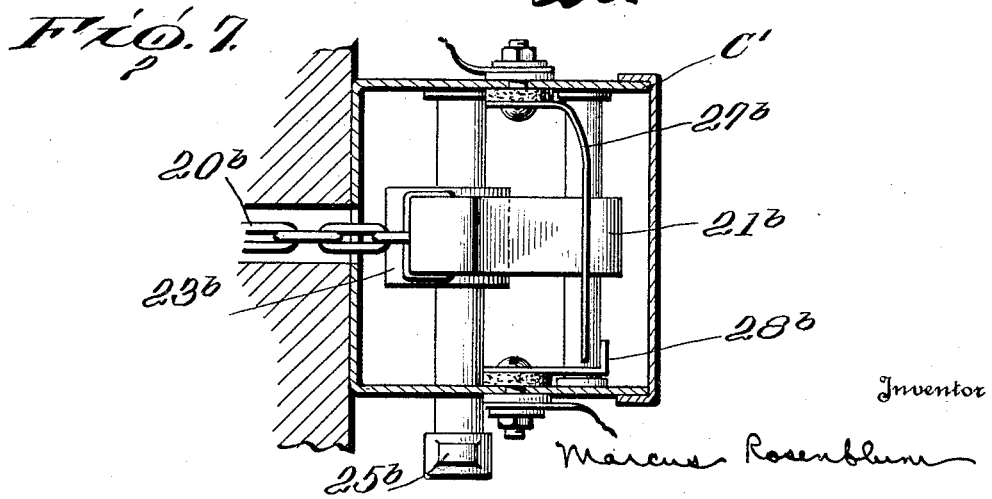

Patented June 28, 1932

1,865,338

UNITED STATES PATENT OFFICE

MARCUS ROSENBLUM, OF LOS ANGELES, CALIFORNIA

DIRECTION INDICATOR FOR VEHICLES

Application filed February 3, 1931. Serial No. 513,215.

This invention is a device by means of which the driver of a motor vehicle may indicate in advance, the direction of a contemplated turn out of a course which he is following, at the time the indication is given.

One of the objects of the invention is to provide a device of simple construction, provided with means by which it may be readily manipulated by the driver of the vehicle to which it is attached. A further object is to provide a semaphore arm equipped with means for normally urging it to a predetermined indicating position, and other means for retaining it in a non-indicating position, so that when the semaphore is released, it will automatically move to its predetermined indicating position. A further object is to provide simple means for illuminating the device while in said predetermined position.

The invention will be hereinafter fully set forth and particularly pointed out in the claims.

In the accompanying drawings:—

Figure 1 is a side elevation diagrammatically illustrating a portion of a motor vehicle with the invention applied thereto. Figure 2 is an enlarged longitudinal sectional view taken at right angles to Figure 1. Figure 3 is a longitudinal sectional view taken at right angles to Figure 2. Figures 4 and 5 are detail sectional views illustrating a slight modification. Figure 6 is a longitudinal sectional view illustrating a second modification, and Figure 7 is a transverse sectional view taken on the line 7—7, Figure 6.

Referring to Figures 1, 2 and 3 of the drawings, 10 designates a portion of the body of an automobile, equipped with the usual upright windshield supports which aid in sustaining the roof of the vehicle. It is to be understood that two of the devices herein disclosed are used with each vehicle, one on each side, but inasmuch as the construction is the same in both instances, but one will be described.

Secured to the windshield upright 11, in any desired manner, as for instance by screws 12, is a casing 13, the outer side of which is open. Rotatably mounted in suitable bearings extending transversely of the casing 13 is a shaft 14, and 15 is a spring engaging said shaft, and normally tending to rotate it in a predetermined direction. Extending radially from said shaft are two arms 16 to which is secured the inner open end of a semaphore arm 17, preferably in the form of a hollow casing. Said semaphore arm is removably secured to the radial arms 16 by suitable means indicated at 18. If desired, an arrow or other indicia 19 may be delineated on the sides of the semaphore casing 17, said casing being constructed of transparent or translucent material, such as glass.

Secured to the shaft 14 so as to rotate therewith, and located between the arms 16 is a pinion 20, meshing with the teeth of a control member 21, slidably mounted in an opening 22 formed in the upright 11. The rear end of said rack member is engaged by the cam portion 23, of an operating device O rotatably mounted in brackets 24, and provided with an operating handle 25. Said cam is provided with a plane abutment surface X complemental to the inner end of the rack member 21, and opposite to said abutment surface with a chord-like surface X'.

In practice, the springs 15 tend to rotate the shaft 14 in a direction to move the semaphore arm to a horizontal position, as indicated in dotted lines, Figure 2. By moving the handle 25 of the locking member to the position indicated in full lines in Figure 2, the rack member is caused to slide forwardly and through the engagement of its teeth with the pinion 20, will force the semaphore arm to the full line position illustrated in Figure 2, against the tension of spring 15. The parts will be held in this position by the abutment portion X, of the operating member O, because rearward movement of the rack bar under the tension of the springs 15 is prevented by said cam member, which is practically in a dead-center position. By moving the handle 25 to the dotted line position, Figure 2, the spring tension tending to rotate the shaft 14 will cause the rack bar 21 to move rearwardly, clearance for this movement being provided by the chord-like portion X' on the cam.

It is preferred to illuminate the semaphore arm by means of an electric lamp L placed therein. For this purpose a simple socket 26 is secured between the arms 16 in any desired manner, and is connected in a manner well understood in the art, with a switch S. This switch has two contacts 27 and 28, the last mentioned contact being a spring member which normally tends to maintain a closed circuit relation with the other contact. The rack bar 21 is provided with a cam portion 29, and it will be observed from the drawings that the spring contact 28 is so positioned that as the rack bar moves forwardly, the spring arm will be positively raised to break the circuit, and when the rack moves rearwardly the tension of the spring arm will react to close the circuit, so that as the semaphore arm is brought to indicating position it is illuminated, and the illumination is shut off when it returns to its non-indicating position.

Referring to Figures 4 and 5, the shaft 14$^a$ extends through the vertical bar 11$^a$ of the windshield frame. On the outer end of this shaft is secured the semaphore member 17$^a$, which is the same in construction as the previously described semaphore member, and attached to the shaft 14$^a$ in substantially a similar manner.

The inner end of said shaft 14$^a$ extends into a casing C within the car, in which is located the pinion 20$^a$, the rack member 21$^a$, and the spring 15$^a$. Said rack member 21$^a$ is engaged by the operating member O', supported in suitable brackets, as clearly shown in Figure 4, and of approximately the same construction as the previously described operating member O. The contact for controlling the lamp is operated in identically the same manner as the contact first described.

In the construction illustrated in Figures 6 and 7, 11$^b$ is an upright portion of the body of an automobile, and has secured to the outer face thereof, a casing 13$^b$, the front of which is open. Pivotally mounted at one end in said casing 13$^b$ is a semaphore arm 17$^b$, having its inner end connected by a chain 20$^b$ with the free end of a lever 21$^b$, which is pivotally mounted at one end within a casing C' located within the automobile body. The chain 20$^b$ passes through a suitable hole in the upright 11$^b$, as shown.

Movement is imparted to the lever 21$^b$ by means of a cam or eccentric 23$^b$, carried by a rock shaft suitably mounted within the casing C', and movement is imparted to said eccentric by means of a handle 25$^b$ secured to said shaft.

To establish the circuit to the lamp (not shown) a spring contact 27$^b$ is so arranged that it will normally engage a fixed contact 28$^b$, so as to maintain a closed circuit, said circuit being broken by the lever 21$^b$ during its movement in one direction, as clearly indicated in Figure 7.

In operation, the weight of the semaphore arm 17$^b$ normally tends to hold it in a vertical depending position within the casing 13$^b$, as indicated in Figure 6. By moving the handle 25$^b$ to the position indicated in dotted lines, the lever 21$^b$ is moved to the right as viewed in Figure 6, exerting a pull on the chain 20$^b$ and swinging the semaphore arm 17$^b$ on its pivot to a position projecting from the casing 13$^b$. The movement of the lever is effected by reason of the cam or eccentric 23$^b$, being rotated by the handle 25$^b$. As the lever 21$^b$ moves to the right, as viewed in Figure 6, it engages the swing contact 27$^b$ and moves it out of engagement with the contact 28$^b$.

The advantages of the invention will be readily apparent to those skilled in the art to which it belongs. For instance, it will be noted that an exceedingly simple device is provided, by means of which the indicating arm is under a spring tension normally urging it to an indicating position, upon release of the locking means controlled by the operating member. Also that said operating member may be easily manipulated to move the semaphore to non-indicating position. The parts are of simple construction and are positioned for convenient manipulation by the driver of the vehicle.

Having thus explained the nature of the invention and described an operative manner of constructing and using the same, although without attempting to set forth all of the forms in which it may be made, or all of the forms of its use, what is claimed is:—

1. A direction indicator comprising a rotatable shaft carrying a radially disposed semaphore member, yieldable means acting to normally rotate said shaft in a direction to move the semaphore member to indicating position, a movable actuator member connected to one end with said shaft, and a cam engaging said actuator member so as to move the semaphore to non-indicating position, said cam having means for normally holding said operating member against return movement.

2. A direction indicator comprising a rotatably mounted shaft carrying a radially disposed semaphore member, a pinion also carried by said shaft, a rack engaging said pinion, spring means tending to rotate said shaft in a predetermined direction so as to move the semaphore member to indicating position, and operating means for moving said rack in one direction to rotate said shaft against the tension of said spring, said operating means including means for normally preventing movement of the rack in the other direction, so as to hold said semaphore member in a non-indicating position against the rotating tension of said spring means.

3. A direction indicator comprising a rotatably mounted shaft carrying a radially disposed semaphore member, spring means tending to rotate said shaft in a predetermined direction so as to move the semaphore member to indicating position, a control member for moving said shaft in one direction to increase the tension of said spring means, and an operating cam engaging said control member, said cam having means for moving the control member in one direction and other means for normally preventing return movement of said control member.

4. A direction indicator comprising a rotatably mounted shaft carrying a radially disposed semaphore member, a pinion secured to said shaft, spring means tending to rotate said shaft in a predetermined direction so as to move the semaphore member to indicating position, a slidably mounted control member having teeth engaging said pinion, and a rotatably supported operating member having a cam portion engaging one end of said rack and so shaped that it will move the control member in one direction against the tension of said spring means, and thereby hold said shaft against rotation under said tension, said cam portion also being shaped to free said control member when the operating member is moved to a predetermined position.

5. A direction indicator comprising a rotatably mounted shaft carrying a radially disposed semaphore member, spring means tending to rotate said shaft in a predetermined direction so as to move the semaphore member to indicating position, a pinion carried by said shaft, a rack member engaging said pinion so that rotation of the shaft under said spring tension will move the rack in one direction, means for moving the rack in the other direction so as to move the semaphore to non-indicating position in opposition to said spring tension, said moving means including means for normally preventing return movement of the rack under said spring tension, a lamp for illuminating said semaphore, and a switch controlling said lamp, said rack member having means for controlling the operation of said switch.

6. A direction indicator comprising a rotatably mounted shaft, spring means tending to rotate said shaft in a predetermined direction, arms radially mounted on said shaft, a semaphore casing having one end secured to said arms, a pinion mounted between said arms, means cooperating with said pinion for moving said casing in a non-indicating position against the tension of said spring means, and means controlled by the said last mentioned means including means for normally preventing return movement of said semaphore casing, and means for illuminating said casing.

7. A direction indicator comprising a rotatably mounted shaft provided with radially disposed arms, springs engaging the end portions of said arms and applying tension tending to rotate said shaft in a predetermined direction, a pinion secured to said shaft and located between said arms, a semaphore casing having one end connected to said arms, a lamp within said casing, a rack member engaging said pinion, and a rotatably mounted cam member engaging the inner end of said rack member, said cam member having means for moving the rack member in one direction against the tension of said spring, and means for normally preventing return movement of said rack member, and circuit control means for said lamp, said rack member having means for controlling the operation of said circuit control means.

8. A direction indicator comprising a rotatably mounted shaft carrying a radially disposed semaphore member on one end thereof, spring means engaging the other end of said shaft and tending to rotate the shaft in a predetermined direction so as to move the semaphore member to indicating position, a pinion carried by the last mentioned end of the shaft, and means engaging said pinion for releasably holding the semaphore member in a non-indicating position against the tension of said spring means.

9. A direction indicator comprising a rotatably mounted shaft carrying a radially disposed semaphore member on one end thereof, spring means engaging the other end of said shaft and tending to rotate the shaft in a predetermined direction so as to move the semaphore member to indicating position, a pinion secured to said shaft contiguous to said spring, a slidable rack member engaging said pinion, and cam means for moving said rack member in one direction, so as to impart rotative movement to the shaft in one direction against the tension of said spring means, said cam means including means for releasably holding the rack member against return movement under the spring tension.

10. A direction indicator comprising a semaphore pivotally mounted at one end, a movably mounted control member operatively connected with said semaphore, so that actuation of the control member will impart movement to said semaphore, and an operating cam engaging said control member, so as to operate the same.

11. A direction indicator comprising a semaphore pivotally mounted at one end, a movably mounted control member operatively connected with said semaphore, so that actuation of said control member will impart movement to the semaphore, a rotatably mounted operating device having an eccentric periphery normally engaging said control member, and a handle for rotating said operating device.

12. A direction indicator comprising a semaphore pivotally mounted at one end, a pivotally mounted control lever, a flexible member connecting said semaphore and said control lever, so that actuation of said lever will impart movements to the semaphore, a rotatably mounted cam engaging said control member, and a handle for actuating said operating device.

In testimony whereof I have hereunto set my hand.

MARCUS ROSENBLUM.